Figure 1:
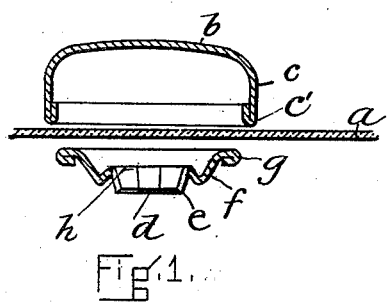

No. 707,504. Patented Aug. 19, 1902.
W. B. H. DOWSE.
FASTENER.
(Application filed June 7, 1900.)
(No Model.)

WITNESSES:
INVENTOR:

UNITED STATES PATENT OFFICE.

WILLIAM B. H. DOWSE, OF NEWTON, MASSACHUSETTS, ASSIGNOR TO CONSOLIDATED FASTENER COMPANY, OF PORTLAND, MAINE.

FASTENER.

SPECIFICATION forming part of Letters Patent No. 707,504, dated August 19, 1902.

Application filed June 7, 1900. Serial No. 19,372. (No model.)

*To all whom it may concern:*

Be it known that I, WILLIAM B. H. DOWSE, of Newton, in the county of Middlesex and State of Massachusetts, have invented a new and useful Improvement in Fasteners, of which the following, taken in connection with the accompanying drawings, is a specification.

My invention consists of a new and improved snap-fastener and the members thereof, which consist of a socket and stud, one at least of these members being resilient, so as to operate in the usual manner.

In the drawings which accompany this specification an embodiment of my invention is illustrated.

Figure 2:
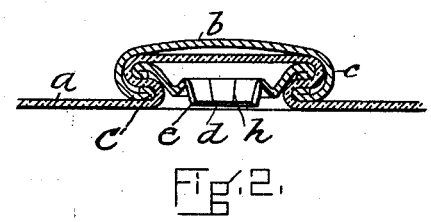
Figure 3:
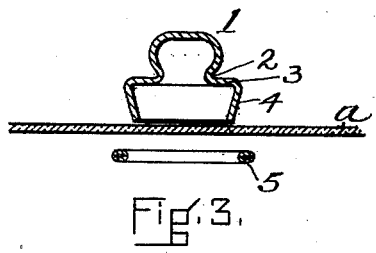

Figure 1 shows the two parts of the socket member in readiness for attachment to the material of the glove or other garment on which the fastener is to be used. Fig. 2 shows the socket member attached to the material. Fig. 3 shows the two parts of the stud member in readiness for attachment, and Fig. 4 the stud attached to the material.

The socket member of the fastener (shown in Figs. 1 and 2) consists of a cap $b$, having a downturned flange $c$, which may be rolled or turned at its edge $c'$, so as to present a smooth surface to the material, and a stud-receiving collar, which comprises the stud-opening $d$, the lip $e$, flange $f$, edge $g$, (which may be rolled over to secure a smooth surface,) and, if the socket member is to supply the required resiliency, the slits or openings $h$. The socket member is attached to the material by fitting the cap and stud-receiving collar together, with the material between them, the flange $c$ of the cap having an internal diameter sufficient for the purpose. Then by means of a suitable tool or press the flange $c$ is crimped or rolled under the edge $g$ of the flange $f$, confining the material and securely joining the two parts of the socket member. The lip $e$ and flange $f$ are proportioned so that sufficient space is left above the opening $d$ for the entry of the stud. (Shown in Figs. 3 and 4.)

Figure 4:
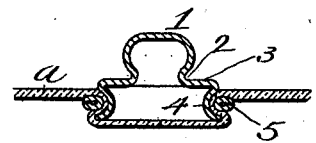

The stud member (shown in Figs. 3 and 4) consists of two parts, a ring 5, rolled or rounded, so as to present a smooth surface, and the stud, which comprises the central crown 1, the constricted neck 2, the shoulder 3, and flange 4. The flange 4 is preferably a little contracted at its mouth, presenting a conical rather than a cylindrical surface, although a plain cylindrical flange may be made to serve. The ring 5 I prefer to construct by rolling over a ring or band of sheet metal, so that in effect it is an annular tube, slightly flattened, with the meeting edges of the tube on the outside of the ring, and thereby forming a split tubular ring. This construction insures a smooth and unbroken surface and guards against abrasion of the fabric or material $a$. The stud member is attached as follows: The stud part and ring are put together on opposite sides of the material $a$, the ring 5 embracing the flange 4 and the material between. Then by means of a suitable tool or press the flange 4 is expanded under the ring and the edge of the shoulder 3 pressed down upon the ring, confining the material between the two pieces. As shown, both the cap and the collar are provided with an inturned portion at the points where the greatest strain is presented—viz., at the points $c'$ and $g$, where the edges oppose each other. This construction not only presents a smooth face to the material, as above pointed out, but also acts as a reinforce to prevent either or both of the opposing edges under pressure from moving in a direction which would permit of a separation of the parts or a reduction of the stretched condition of the material between the parts. The stud of Figs. 3 and 4 is shown as non-resilient and the socket of Figs. 1 and 2 as resilient. These characteristics are interchangeable, as is well known.

I claim—

1. A stud member of a snap-fastener consisting of a ring, a hollow stud having a central crown, a neck below the crown, a shoulder and depending flange, the depending flange lying within the ring, and separated therefrom by the material to which the stud member is attached, the edge of the flange being turned outward so that the ring is held between the outward-turned edge of the flange and shoulder, substantially as shown and described.

2. A stud member of a snap-fastener consisting of a ring, a hollow stud having a central crown, a neck below the crown, a shoulder and depending flange, the flange lying within the ring and separated therefrom by an imperforate flexible material to which the stud member is attached, the flange being turned outward and the shoulder crushed downward, so as to bind the ring and confined material between the outwardly-turned edge of the flange and the shoulder, substantially as shown and described.

3. A snap-fastener consisting of a stud member and a socket member adapted to mutual engagement, the stud member consisting of a ring, a hollow stud having a central crown a neck below the crown, a shoulder and depending flange, the depending flange lying within the ring, and separated therefrom by the material to which the stud member is attached, the edge of the flange being turned outward so that the ring is held between the outward-turned edge of the flange and shoulder, and the socket member consisting of a cap, a stud-engaging collar lying within the cap, and separated therefrom by the material to which the socket member is attached, the edge of the cap being turned under the edge of the collar, and the material confined thereby, substantially as shown and described.

4. A stud member of a snap-fastener consisting of a tubular ring, a hollow stud having a central crown, a neck below the crown, a shoulder and depending flange, the depending flange lying within the ring, and separated therefrom by the material to which the stud member is attached, the edge of the flange being turned outward so that the ring is held between the outward-turned edge of the flange and shoulder, substantially as shown and described.

5. A stud member of a snap-fastener consisting of a split tubular ring, a hollow stud having a central crown, a neck below the crown, a shoulder and depending flange, the depending flange lying within the ring, and separated therefrom by the material to which the stud member is attached, the edge of the flange being turned outward so that the ring is held between the outward-turned edge of the flange and shoulder, substantially as shown and described.

6. A stud member of a snap-fastener consisting of a tubular ring, a hollow stud having a central crown, a neck below the crown, a shoulder and depending flange, the flange lying within the ring and separated therefrom by an imperforate flexible material to which the stud member is attached, the flange being turned outward, and the shoulder crushed downward, so as to bind the ring and confined material between the outwardly-turned edge of the flange and the shoulder, substantially as shown and described.

7. A stud member of a snap-fastener consisting of a split tubular ring, a hollow stud having a central crown, a neck below the crown, a shoulder and depending flange, the flange lying within the ring and separated therefrom by an imperforate flexible material to which the stud member is attached, the flange being turned outward, and the shoulder crushed downward, so as to bind the ring and confined material between the outwardly-turned edge of the flange and the shoulder, substantially as shown and described.

In testimony whereof I have signed my name to this specification, in the presence of two subscribing witnesses, on this 4th day of June, A. D. 1900.

WM. B. H. DOWSE.

Witnesses:
G. W. PHILLIPS,
A. H. FLANNERY.